(12) United States Patent
Kutaragi et al.

(10) Patent No.: US 6,724,693 B1
(45) Date of Patent: Apr. 20, 2004

(54) OPTICAL DISK HAVING READABLE INFORMATION ON BOTH SIDES OF THE DISK COMBINATION WITH AN OPTICAL DISK DEVICE

(75) Inventors: Ken Kutaragi, Kanagawa (JP); Kazuo Miura, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/505,047

(22) Filed: Feb. 16, 2000

(30) Foreign Application Priority Data

Feb. 19, 1999 (JP) .......................... P11-42392

(51) Int. Cl.$^7$ .............................. G11B 11/00
(52) U.S. Cl. .................... 369/13.02; 369/47.1
(58) Field of Search ................. 369/13.02, 47.1, 369/53.11, 59.21, 275.3, 59.23, 47.11, 14, 53.21, 275.1; 360/32, 39; 380/228

(56) References Cited

U.S. PATENT DOCUMENTS 4,903,255 A  2/1990 Sugaya et al.
5,473,584 A * 12/1995 Oshima .................. 369/47.11

FOREIGN PATENT DOCUMENTS

| DE | 42 42 992 A1 | 6/1994 |
| EP | 0608126 A2 | 7/1994 |
| EP | 0953937 A1 | 11/1999 |
| GB | 2290526 A | 1/1996 |
| JP | 60-193145 | 10/1985 |
| JP | 3-263618 | 11/1991 |
| JP | 09-017038 | 1/1997 |
| JP | 10-188362 | 7/1998 |
| JP | 11-025540 | 1/1999 |
| JP | 11-250522 | 9/1999 |

* cited by examiner

Primary Examiner—Ali Neyzari
(74) Attorney, Agent, or Firm—Katten Muchin Zavis Rosenman (57) ABSTRACT

An optical disk has a magnetic recording medium and/or magnetic playback medium. The magnetic substance carrying recording data is formed on the label side of the optical disk. The magnetic substance is formed as a pattern of a desired shape by silk screen printing using an ink containing a magnetic substance.

15 Claims, 8 Drawing Sheets

OPTICAL DISK HAVING READABLE INFORMATION ON BOTH SIDES OF THE DISK COMBINATION WITH AN OPTICAL DISK DEVICE

BACKGROUND OF THE INVENTION

1. Field of the Invention

This invention relates to an optical disk, a method for manufacturing an optical disk, and an entertainment system featuring that optical disk.

2. Description of the Prior Art

An optical disk such as a CD-ROM, CD-R, single-sided MO, or single-sided DVD generally has the manufacturer's name, recording data, and so forth indicated by silk screen printing on its label side (the side opposite to the recording and playback side).

SUMMARY OF THE INVENTION

It has never occurred to anyone up to now to use the label side to magnetically record or reproduce the desired data on one of these optical disks.

It is an object of the present invention to provide a magnetic recording medium and/or a magnetic playback medium on the label side of an optical disk.

The objects of the present invention are attained by an optical disk including a magnetic substance formed on the label side of the optical disk. The above-mentioned magnetic substance is used as a magnetic recording medium or a magnetic playback medium.

The optical disk of the present invention is such that personal information about the owner of the above-mentioned optical disk is recorded on the above-mentioned magnetic substance.

The optical disk of the present invention is such that the above-mentioned magnetic substance is formed by printing.

The optical disk of the present invention is such that the above-mentioned magnetic substance is formed in a desired shape by silk screen printing using an ink containing a magnetic substance.

The optical disk of the present invention is such that said desired shape is a shape of a circle that is concentric with an outer circumference of the disk.

The optical disk of the present invention is such that the above-mentioned desired shape is a radial shape with respect to the disk.

The optical disk of the present invention is such that the above-mentioned desired shape is a bar-code shape.

The optical disk of the present invention is such that the magnetic substance in the desired shape is formed by printing.

The optical disk of the present invention is such that the magnetic substance is formed by printing in the region to the inside of a lead-in.

The optical disk of the present invention is such that the magnetic substance is formed by printing in the region to the outside of a lead-out.

The optical disk of the present invention is such that the magnetic substance utilizes recording and/or playback for security information.

An entertainment system that makes use of the optical disk of the present invention.

A method for manufacturing an optical disk of the present invention comprises the steps of performing mastering, performing replication, and forming a magnetic recording/playback medium on the top side of the disk by silk screen printing using an ink containing a magnetic substance.

DETAILED DESCRIPTION OF THE PREFERRED EMBODIMENTS OF THE INVENTION

Embodiments of the optical disk of the present invention, the method for manufacturing this optical disk, and the entertainment system in which this optical disk is utilized will now be described with reference to the appended figures of the drawings.

The optical disk of an embodiment of the present invention may be a CD-ROM, CD-R, a single-sided MO, a single-sided DVD, or the like. A CD-ROM will be used as an example in the following description, as it is the most well-known and popular such disk at the present time. It should be understood, however, that the present invention is not limited to the CD-ROM or any of the above structures.

Figure 1A:
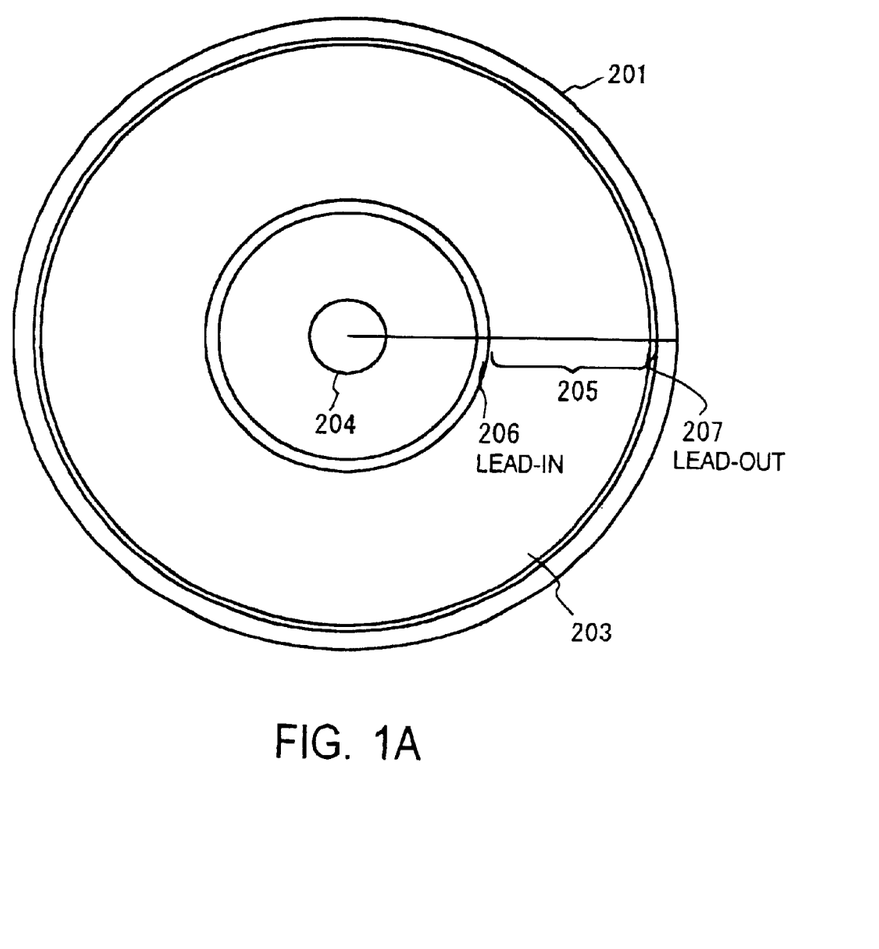
FIG. 1A is a view of a CD-ROM seen from the side of its substrate.
Figure 1B:
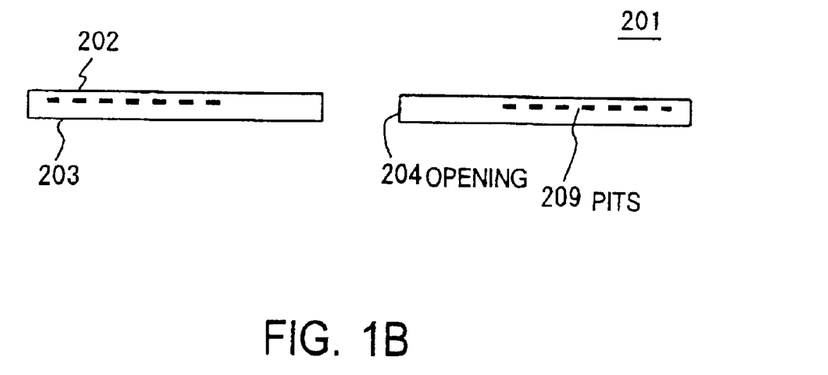
FIG. 1B is a sectional view of the CD-ROM of FIG. 1A.

A CD-ROM 201 comes in standard diameters of 120 mm and 80 mm. FIGS. 1A and 1B show the CD-ROM 201 with a diameter of 120 mm. Here, FIG. 1A is a view of the CD-ROM 201 from the substrate side 203, while FIG. 1B is a cross sectional view of the CD-ROM disk.

The contents of the recording on the CD-ROM, the distributor's name, and other designs are generally screen printed in a UV-setting ink on the label side (top side) 202 of the CD-ROM 201.

A metal film that is used to reflect light can generally be seen through the transparent substrate from the substrate side 203.

This CD-ROM 201 has a diameter of 120 mm, and the opening made in the center (center hole) 204 has a diameter of 15 mm. Music, games, and other programs are recorded within a range having an inside diameter of 50 mm and an outside diameter of 116 mm. This range is called the recording area 205.

Signals are recorded as a single spiral track in the recording area 205 of the disk 201. The rotational direction of the disk 201 is counterclockwise as viewed from the substrate side (lower side), and the signals start from the inner circle.

There is a zone called a lead-in 206 just at the inside of the recording area 205, and there is a zone called a lead-out 207 just at the outside of the recording area 205.

The CD drive (not shown) that drives the CD-ROM 201 can play music if it is a music CD-ROM, and can play a game if it is a game CD-ROM, by detecting the lead-in 206 and lead-out 207.

Figure 2A:
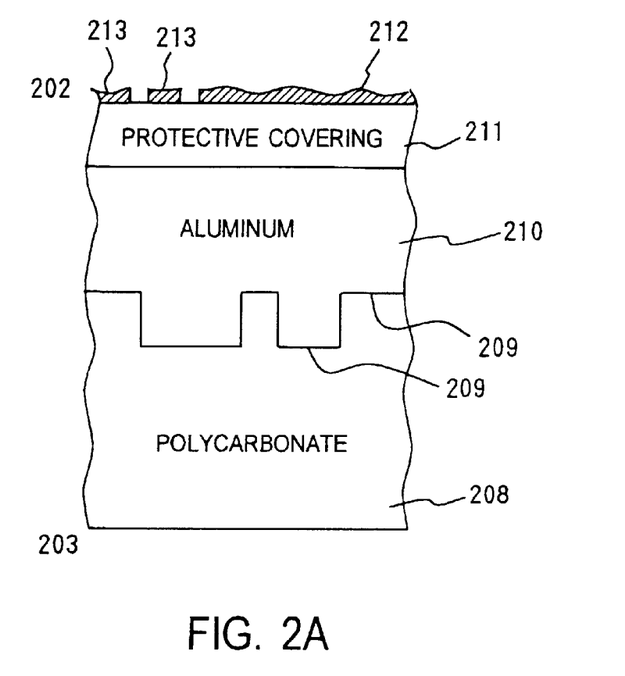
FIG. 2A shows a partial cross sectional detailed view of the CD-ROM.

FIG. 2A is a partial detailed cross section of the CD-ROM 201. A substrate 208 is generally composed of a transparent plastic layer. This plastic layer needs to be heat resistant and to transmit laser light. A polycarbonate (PC) is used as the material for the substrate. Other materials can be also used such as polyvinyl chloride (PVC), acrylic resins (PMMA), and APO (amorphous polyolefins).

Bumps 209 are formed in the recording area on this transparent plastic surface of the substrate. The bumps serve as pits corresponding to signals. The entire surface of the bumps 209 in the recording area is covered with a metal film 210 that is used to reflect light. This metal film 210 may be aluminum which is extremely thin and has a high reflectance. The thickness of the disk is 1.2 mm.

A protective covering 211 composed of a hard resin film is provided over the metal film 210. A screen-printed label 212 containing a magnetic substance is printed over the protective covering 211, or a magnetic substance 213 is disposed thereon.

Screen Printing

The CD-ROM of this embodiment is characterized by the top side 202 of the disk, and has the following four features.

First, magnetic substances 213 and 212 are disposed on the top side 202 of the CD-ROM 201. The inventors are unaware of the existence of a CD-ROM in which a magnetic substance has been formed on the top side of the CD-ROM or any other optical disk of the type under consideration up to now.

Thus disposing the magnetic substances 213 and 212 on the disk top 202 allows these magnetic substances to be utilized to magnetically record information that specifies this particular CD-ROM, for instance.

Second, magnetic substances 213 and 212 can be written to, read, or erased by a recording head, a playback head, an erasure head (not shown), or the like furnished to the disk drive for the magnetic substances 213 and 212 disposed on the disk top 202. Since magnetic recordings can thus be recorded, played back, and erased, personal information about the owner of the disk, for example, can be magnetically recorded after the purchase of the disk.

Third, the magnetic substance 212 disposed on the disk top may be formed by silk screen printing. The magnetic substance can be formed in the desired shape (design) on the disk top by mixing a magnetic material into a screen printing ink material, and using such ink for screen printing.

Figure 2B:
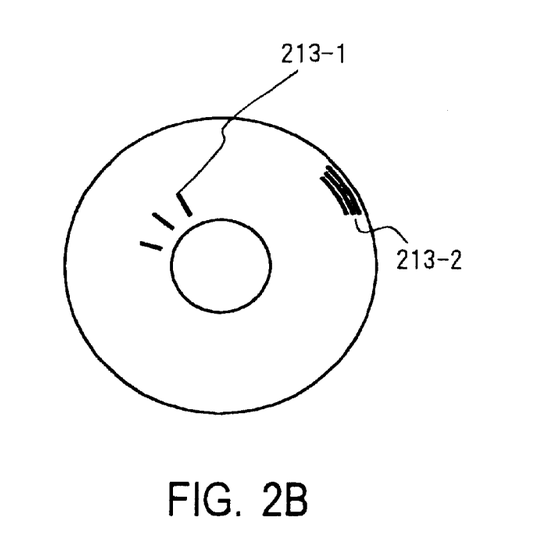
FIG. 2B is a diagram illustrating examples of the shape of a magnetic pattern.

As shown in FIG. 2B, the pattern of the magnetic substance may be in any desired shape such as a radial pattern 213-1 or a concentric circular pattern 213-2. Alternatively, the shape of the magnetic substance may be such that a specific code such as a bar code can be recorded.

Regarding the recording area, when an ink material containing a magnetic material is printed over the top side of a commonly used CD-ROM, the aluminum metal film 210 of the disk may pose a magnetic barrier that makes it difficult to detect magnetism from the substrate side (lower side). In this case, a magnetic sensor such as a magnetic head or a magnetic pickup can be disposed above the label side (top side) 202 of the disk.

When a magnetic sensor is disposed on the substrate side (lower side) 203 of the disk, then the region excluding the recording area 205 described in connection with FIG. 1A (that is, the region other than the aluminum metal surface), such as the region at the inside of the lead-in 206 and/or the region at the outside of the lead-out 207, should be printed.

Fourth, the magnetic recording substances or media 213 and 212 formed on the label side 202 of the disk can be used for security purposes. The term "security" as used here refers to not allowing the unauthorized use of the CD-ROM. For example, it means preventing the unauthorized duplication of the CD-ROM itself, the unauthorized copying of the data recorded on the CD-ROM, and the use of this CD-ROM by anyone other than its owner, and refers to all other activities such as manufacturing, selling, using, and duplicating that would infringe on patent rights, trademark rights, copyrights, and other intangible property rights.

A number of specific means can be employed when this magnetic recording is used for the purpose of security. For instance, let us assume that a disk in which magnetic information (such as the product serial number) is recorded on the disk top is a CD that has just been purchased (new). In this case, when this disk is played in a CD drive for the very first time, this magnetic information is read by the playback head (read head) with which the device is equipped, and stored in a memory inside the device. At the same time, information to the effect that the disk is used is magnetically recorded.

If the CD drive is a dedicated device for this disk, such as when the disk contains TV game software and the CD drive is a dedicated device for TV games, then the dedicated TV game device is equipped with means for performing a registration operation for information about the disk (such as the product serial number) if the disk is new, and at the same time writing to the disk that the disk is used and writing to the memory inside the TV game device that the disk has been registered. The dedicated TV game device is further provided with means so that the only used disks that can be driven are those with a product serial number that has been registered in the internal memory of the device. The provision of this means prevents the resale of used disks and their unauthorized duplication.

Operation

Figure 3:
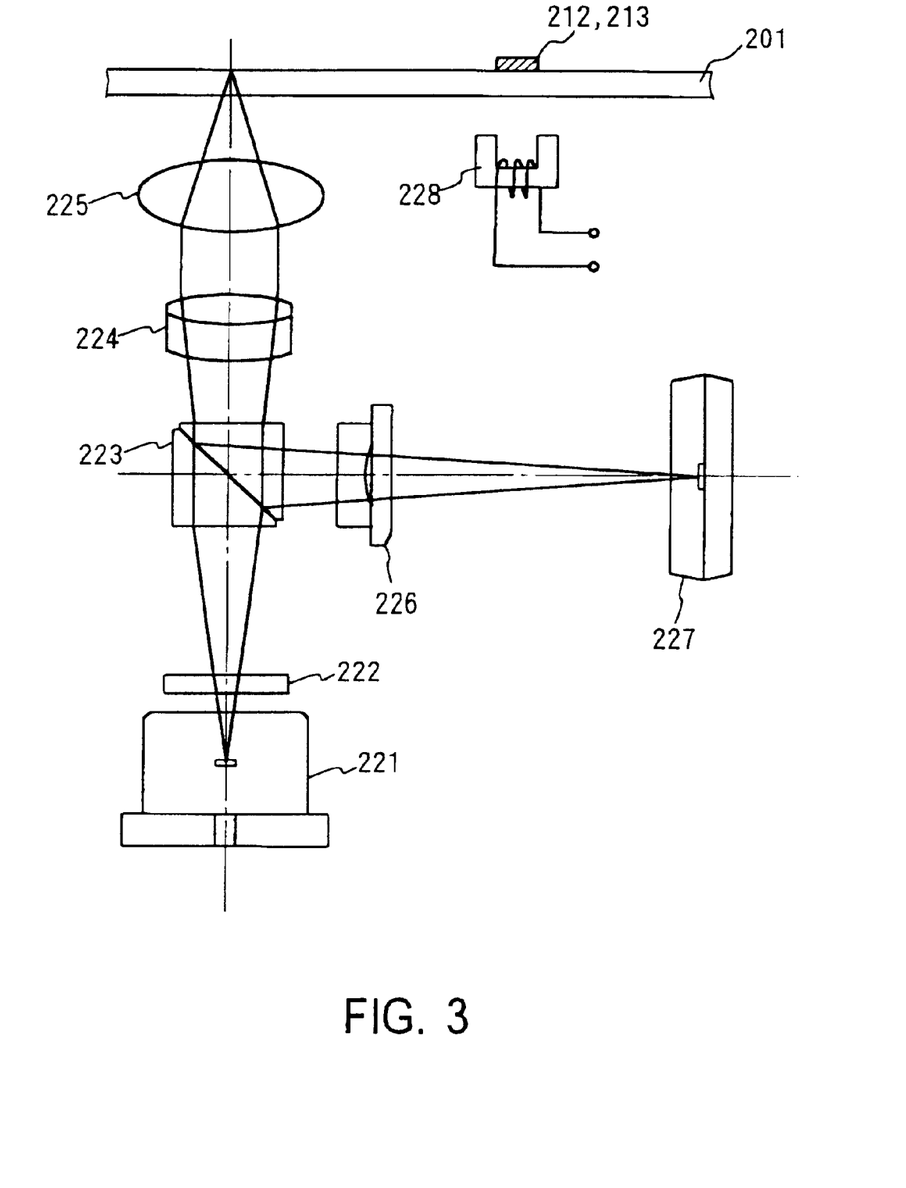
FIG. 3 is a diagram illustrating the main components of a CD-ROM drive.

The manner in which the CD-ROM 201 is driven by the CD drive will now be described. FIG. 3 is a detailed diagram of a CD drive in which the CD-ROM 201 has been loaded. Laser light outputted from a semiconductor laser 221 goes through a diffraction grating 222 and then through a beam splitter 223, and is made into parallel light by a collimator lens 224. This light is focused by an object lens 225 onto the surface (reflective film) of the disk 201. The laser light reflected off the disk surface goes through the collimator lens 224 via the object lens 225, is reflected by the dielectric film of the beam splitter 223 and changes its orientation by 90 degrees, and is then incident on a photodiode 227 via a focal detecting lens 226, whereupon the state of the pits in the reflective film is detected.

This CD drive is further equipped with a magnetic sensor 228 as a sensor for the magnetic material 213 or magnetic material-containing screen printing 212 formed on the top of the CD. There may be one or more of the magnetic sensors 228, and it may be a recording head, playback head, erasure head, or the like as dictated by the intended use.

Manufacturing Method

Figure 4:
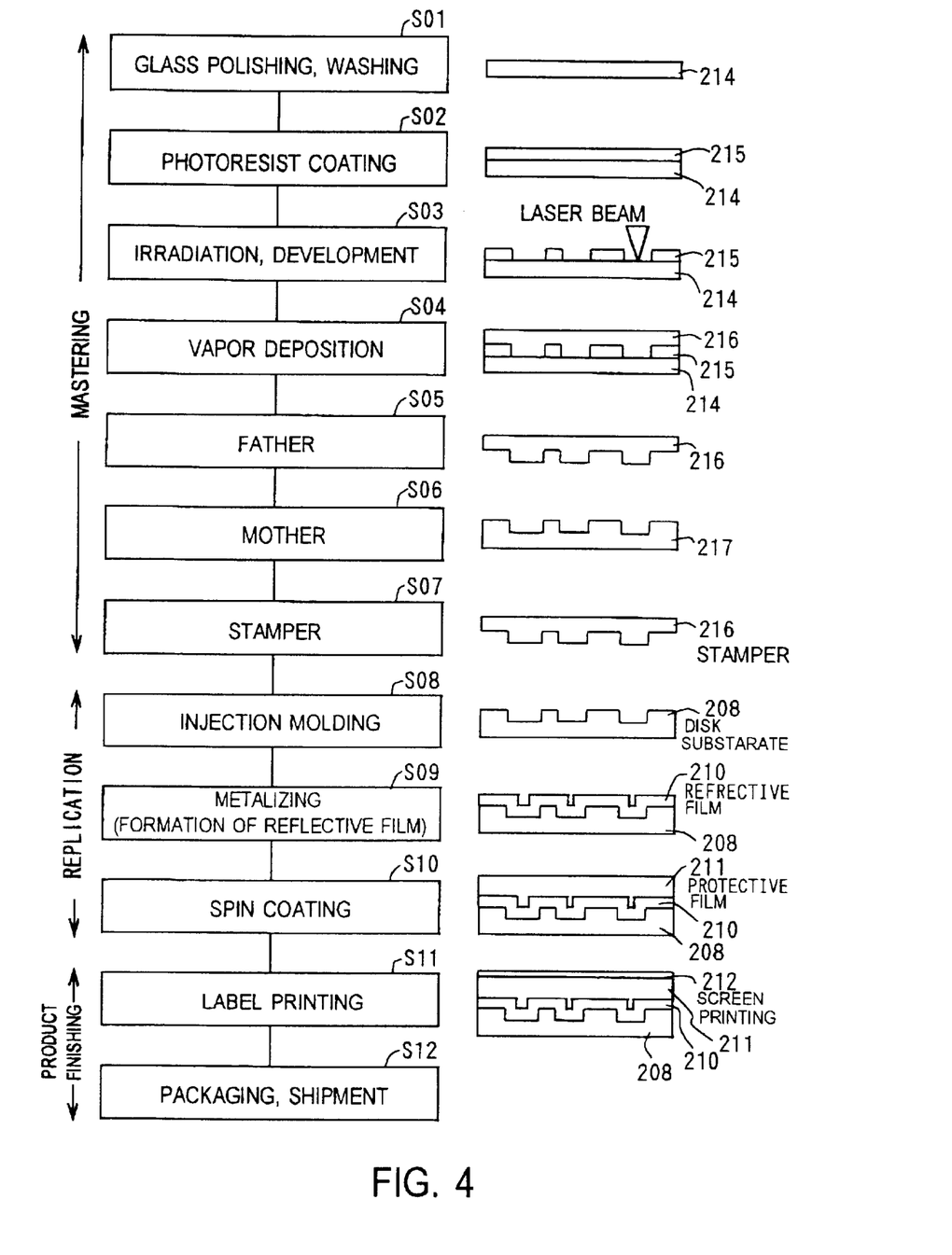
FIG. 4 is a diagram illustrating a method for manufacturing a CD-ROM of the present invention.

The method for manufacturing the CD-ROM of the present invention will be briefly described with reference to FIG. 4.

In the manufacturing process, steps S01 to S07 are referred to as the mastering process, steps S08 to S10 are called the replication (pressing) process, and steps S11 and S12 are called the product finishing process.

In the mastering process, a glass blank 214 is polished and washed in step S01. In step S02 the glass blank 214 is coated with a photoresist 215 by spinning or another such method. In step S03, this photoresist 215 is irradiated with a laser beam and developed, whereupon the exposed places become pits. This product is called a glass master.

Nickel 216 is vapor deposited in step S04. In step S05 the glass master is removed to produce a metal master (father)

216. This metal master 216 is called a stamper. In step S06, a mother 217, which is used to make additional stampers from the metal master, is produced at the same time. The stamper 216 (metal master) is readied in step S07. This metal master is used as a stamper in an injection molding process, and goes into the mass production process.

A disk substrate 208 is produced in step S08 by injecting plastic into the stamper 216. In step S09, aluminum is vapor deposited over the surface of the disk substrate 208 to form a reflective film 210. In step S10, the surface of the reflective film 210 is covered with a hard resin layer by spin coating, creating a protective film 211.

In step S11, the above-mentioned ink containing a magnetic material is used to screen print labels 212 and 213 on the disk surface. The disk thus completed is shipped as a finished product from the factory.

The ink containing a magnetic material is typically used in a proportion of about 20:80 (magnetic material to ink) so that the recording and playback of the magnetic recording signals will be carried out reliably, while maintaining the characteristics of the ink. Other proportions may be used instead, however.

Whether a diamagnetic material, a ferromagnetic material, a paramagnetic material, or another material is used for the magnetic material is determined by the CD being used, the CD drive, the magnetic information to be recorded, and so forth.

An entertainment device, such as a TV game device, to which this CD-ROM is applied will now be briefly described.

Device to Which the Present Invention is Applied

Figure 5:
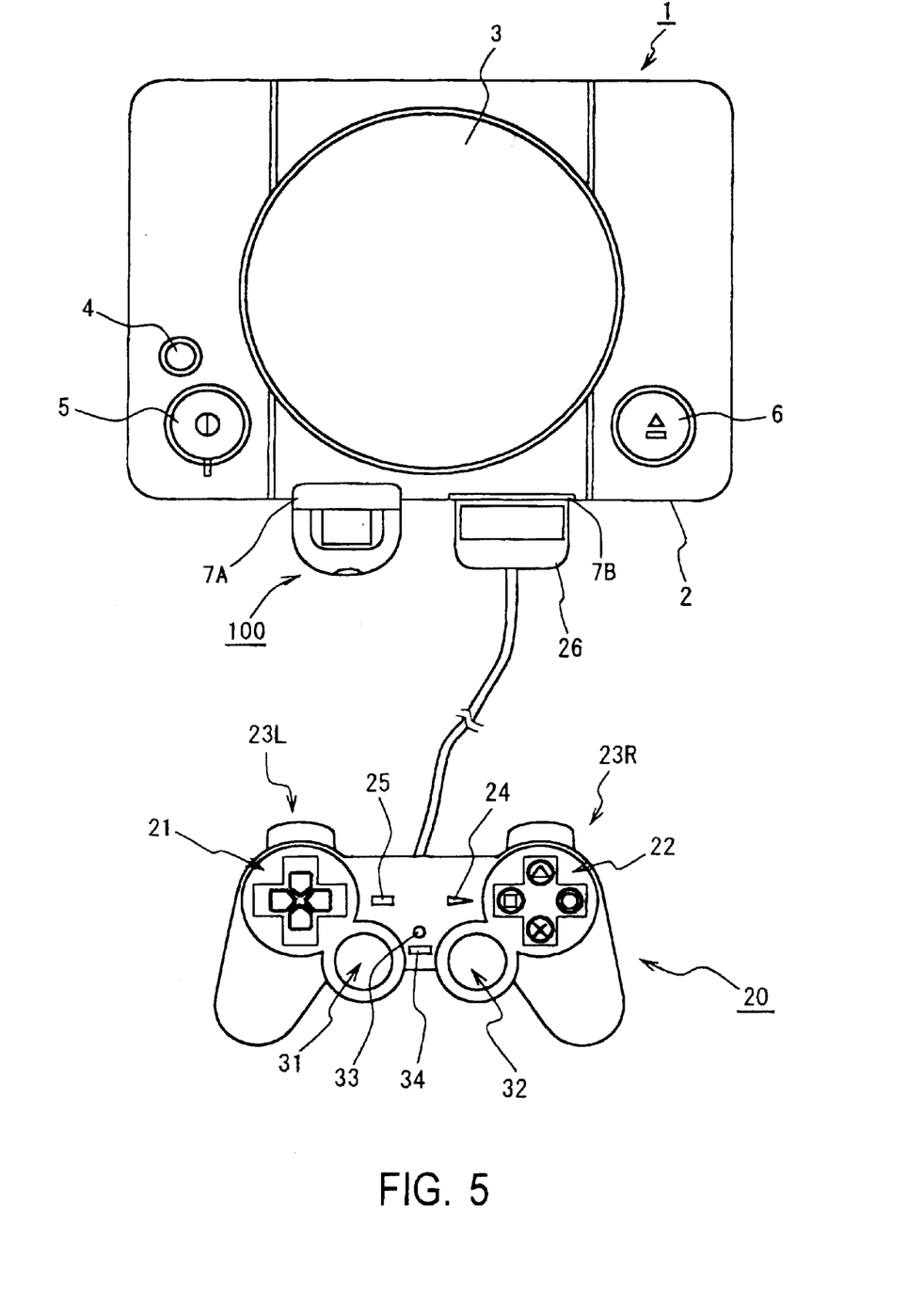
FIG. 5 is a plan view of an entertainment system in which the CD-ROM of the present invention is used.

FIG. 5 illustrates a video game device as an example of an entertainment system. This video game device 1 reads a game program recorded on an optical disk such as a CD-ROM, and executes the game according to instructions from the user (game player). The "execution of the game" primarily refers to controlling the progress of the game and the display and audio.

A main unit 2 of the video game device 1 comprises a disk loading component 3 for loading in the center thereof a CD-ROM or other optical disk that is a recording medium for supplying the video game or other application program, a reset switch 4 for resetting the game as desired, a power switch 5, a disk control switch 6 for controlling the loading of the optical disk, and two slots 7A and 7B, for example.

Two control devices 20 can be connected to the slots 7A and 7B, allowing two users to play a competitive game, for example. A memory card device that allows game data to be saved (stored) or read out, or a portable electronic device with which the game can be executed away from the main unit can also be inserted into slots 7A and 7B.

The control device 20 has first and second control components 21 and 22, a left-hand button 23L, a right-hand button 23R, a start button 24, and a select button 25. It also has control components 31 and 32 allowing analog control, a mode select switch 33 for selecting the control mode of the control components 31 and 32, and a display component 34 for displaying the selected control mode.

Figure 6:
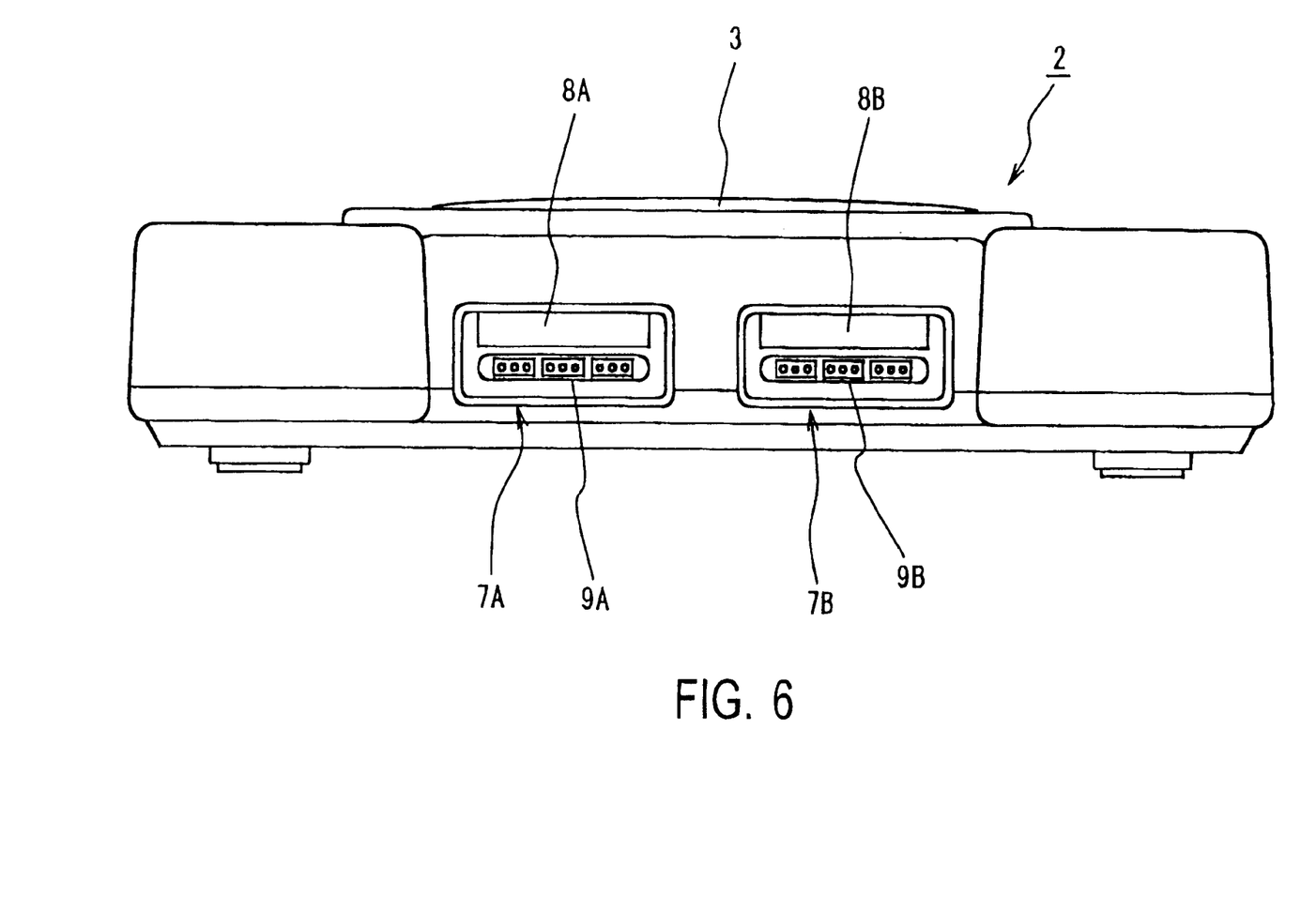
FIG. 6 is a rear view of a host device (video game device)

FIG. 6 illustrates the slots 7A and 7B provided on the front surface of the main unit 2 of the video game device 1. The slots 7A and 7B are each formed in two levels, with the upper levels provided with memory card insertion components 8A and 8B into which a portable electronic device 100 is inserted, and the lower levels provided with controller connectors (jacks) 9A and 9B to which the connection terminals (connectors) 26 of the controller 20 are connected.

The insertion holes (slots) of the memory card insertion components 8A and 8B are formed somewhat asymmetrically so that the memory card cannot be inserted improperly. The controller connectors 9A and 9B are also formed somewhat asymmetrically so that the connection terminals 26 of the controller 20 cannot be connected improperly, and have insertion holes of a different shape from those of the memory card insertion components 8A and 8B so that the memory card cannot be inserted improperly.

Figure 7:
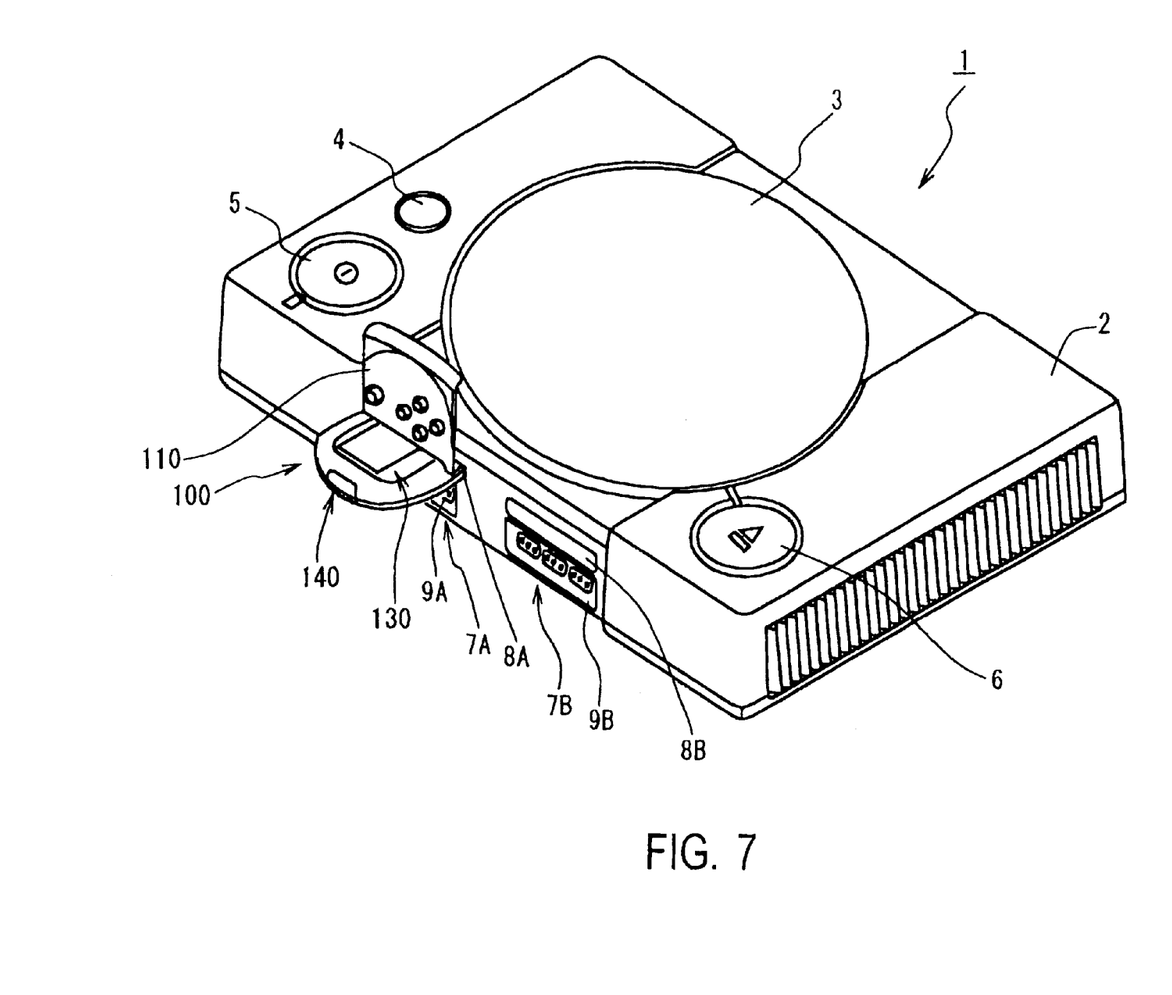
FIG. 7 is a perspective view of a host device (video game device)

FIG. 7 shows the state in which the portable electronic device 100 has been inserted into the memory card insertion component 8A of the slot 7A at the front of the video game device 1.

Figure 8:
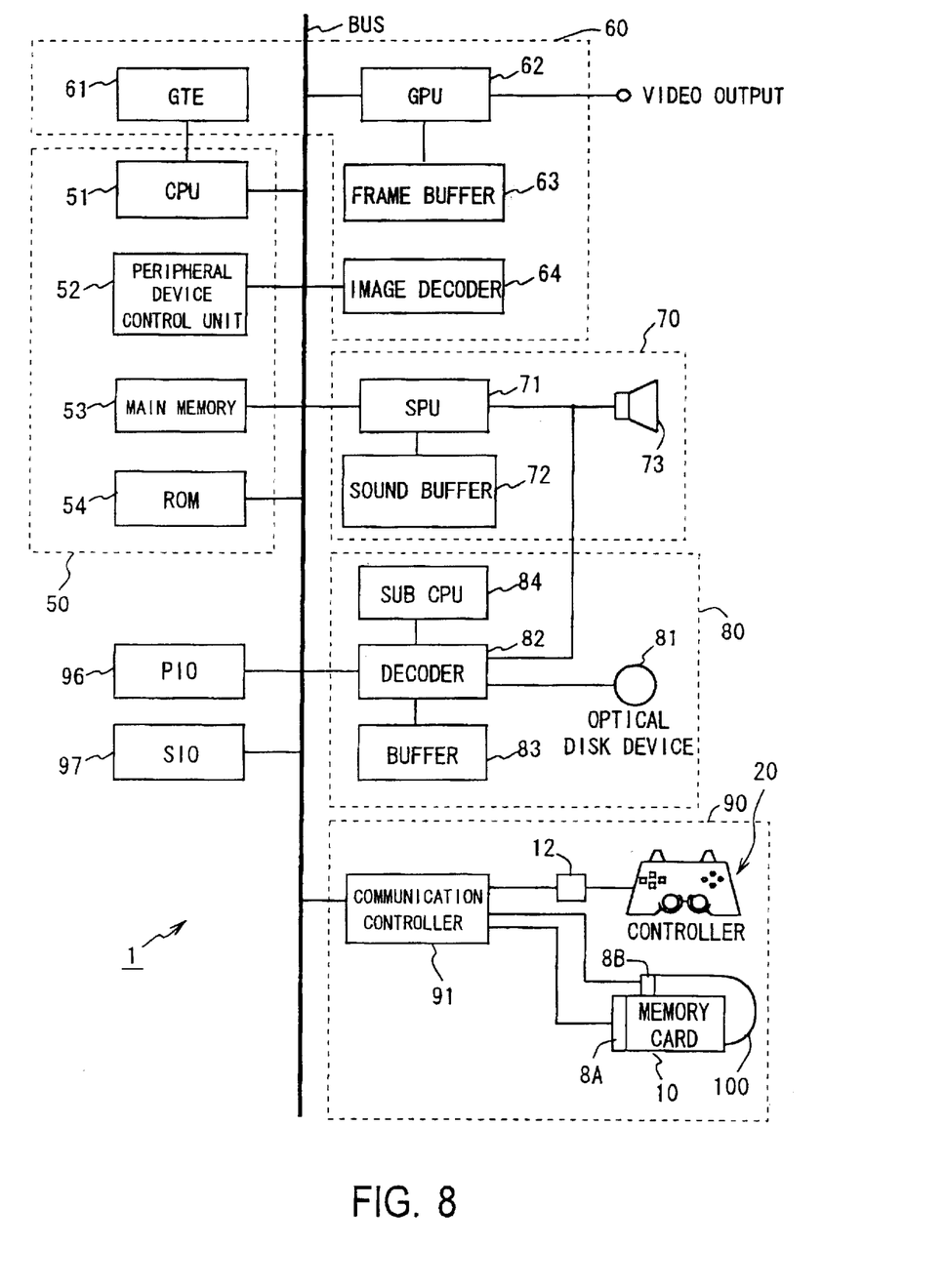
FIG. 8 is a block diagram illustrating the configuration of the main components of a host device (video game device).

FIG. 8 is a block diagram illustrating an example of a simplified circuit structure for the main components of the video game device 1.

The video game device 1 comprises a control system 50 consisting of a central processing unit (CPU) 51 and its peripheral devices, a graphic system 60 consisting of a graphic processing unit (GPU) 62 that draws pictures in a frame buffer 63, etc., a sound system 70 consisting of a sound processing unit (SPU) that generates musical sounds, sound effects, and so forth, etc., an optical disk controller 80 for controlling the optical disk on which the application program is recorded, a communication controller 90 for controlling signals from the controller 20 into which instructions from the user are inputted, as well as the input and output of data from the memory card 10 which stores game settings and so on and from the portable electronic device 100 (discussed below), a bus BUS connected to each of the above components, and so forth.

The control system 50 comprises the CPU 51, a peripheral device controller 52 for performing transfer interrupt control, the control of direct memory access (DMA) transfer, and so on, a main memory 53 consisting of a random access memory (RAM), and a read-only memory (ROM) 54 containing a program such as a so-called operating system that performs the management of the main memory 53, graphic system 60, sound system 70, and so on. The term "main memory" as used here refers to the memory with which the program can be executed.

The CPU 51 controls this video game device 1 as a whole by executing the operating system stored in the ROM 54, and consists of a 32-bit RISC-CPU, for example.

When the power is turned on to this video game device 1, the CPU 51 of the control system 50 executes the operating system stored in the ROM 54, whereby the CPU 51 controls the graphic system 60, the sound system 70, and so forth.

When the operating system is executed, the CPU 51 controls the optical disk controller 80 after the initialization of the entire video game device 1 (such as operation confirmation), and executes the game or other application program stored on the optical disk. This execution of the game or other program causes the CPU 51 to control the graphic system 60, the sound system 70, and so on according to input from the user, and thereby control the display of images and the generation of sound effects and musical sounds.

The graphic system 60 comprises a geometry transfer engine (GTE) 61 for processing coordinate transformation and the like, a GPU 62 for drawing pictures according to drawing instructions from the CPU 51, a frame buffer 63 that stores the images drawn by GPU 62, and an image decoder 64 that decodes image data compressed and coded by orthogonal transform such as discrete cosine transformation.

The GTE 61 is equipped with a serial calculation mechanism for serially executing a plurality of operations, for example, and is designed so that coordinate transformation, light source calculation, matrix or vector operations, and the like can be performed quickly according to operation requests from the CPU 51. In specific terms, in the case of flat shading operations drawn in the same color in a single triangular polygon, for example, this GTE 61 can perform a maximum of about 1.5 million polygon coordinate operations per second, and as a result, the load on the CPU 51 is reduced and high-speed coordinate operations can be performed with this video game device.

The GPU 62 draws polygons and the like in the frame buffer 63 according to draw commands from the CPU 51. This GPU 62 is designed so that a maximum of about 360,000 polygons can be drawn per second.

The frame buffer 63 consists of a so-called dual-port RAM, and is designed so that drawing from the GPU 62 or transfer from the main memory can be performed simultaneously with read-out for display. The frame buffer 63 has a capacity of 1 megabyte, for example, and is handled as a matrix consisting of 1024 pixels horizontally and 512 pixels vertically, each of 16 bits. In addition to the display region outputted as video output, the frame buffer 63 is also provided with a CLUT (Color Look-Up Table) region in which is stored a CLUT that the GPU 62 refers to in drawing polygons or the like, and a texture region in which is stored the texture that is mapped into the polygons or the like drawn by the GPU 62 through coordinate transformation during drawing. The CLUT region and texture region are dynamically varied according to changes in the display region, etc.

In addition to the above-mentioned flat shading, the GPU 62 is also designed to be able to perform gourod shading, in which the color inside a polygon is determined by interpolation from the color at the apex of the polygon, and texture mapping, in which the texture stored in the texture region is laid over the polygon. When gourod shading or texture mapping is performed, the GTE 61 is able to perform coordinate transformations for a maximum of about 500,000 polygons per second.

The image decoder 64 decodes the still or moving image data stored in the main memory 53 under the control of the CPU 51, and stores the result in the main memory 53.

This reproduced image data is stored in the frame buffer 63 via the GPU 62, which allows it to be used as a background for the image drawn by the GPU 62.

The sound system 70 comprises an SPU 71 that generates musical sounds, sound effects, and so forth on the basis of instructions from the CPU 51, a sound buffer 72 in which waveform data and the like are stored by the SPU 71, and a speaker 73 that outputs the musical sounds, sound effects, and so on generated by the SPU 71.

The SPU 71 is equipped with an ADPCM (Adaptive Differential PCM) function for reproducing audio data that has undergone adaptive predictive encoding (ADPCM$^5$) using, for example, 16-bit audio data as 4-bit differential signals, a reproduction function for generating sound effects and the like by reproducing the waveform data stored in the sound buffer 72, a modulation function for modulating and reproducing the waveform data stored in the sound buffer 72, and so on.

Because these functions are provided, the sound system 70 can be used as a so-called sampling sound source that generates musical sounds, sound effects, and so forth on the basis of the waveform data stored in the sound buffer 72 according to instructions from the CPU 51.

The optical disk controller 80 comprises an optical disk device 81 that reproduces the programs, data, or the like recorded on the optical disk, a decoder 82 that decodes the recorded programs, data, or the like with the addition of an error correction code (ECC), for example, and a buffer 83 for raising the speed at which data is read from the optical disk by temporarily storing data from the optical disk device 81. A sub-CPU 84 is connected to the decoder 82.

In addition to the above-mentioned ADPCM data, the audio data read by the optical disk device 81 and recorded on the optical disk also includes so-called PCM data in which audio signals have undergone analog/digital conversion.

For ADPCM data, recorded audio data in which the differential of 16-bit digital data is expressed with 4 bits, for example, is decoded by the decoder 82 and then supplied to the above-mentioned SPU 71, and after undergoing analog/digital conversion or other such processing by the decoder 82, it is used to drive the speaker 73.

For PCM data, audio data recorded as 16-bit digital data, for example, is decoded by the decoder 82 and then used to drive the speaker 73.

The communication controller 90 comprises a communication control device 91 that controls communication with the CPU 51 via the bus BUS, and the communication control device 91 is provided with the controller connectors 9A, 9B connected to the controller 20 that inputs instructions from the user, and the memory card insertion components 8A and 8B connected to the portable electronic device 100 (discussed below) or the memory card 10 as auxiliary storage devices for storing game setting data or the like.

The controller 20 connected to the controller connectors 9A, 9B has, for example, 16 instruction keys for inputting instructions from the user, and the state of these instruction keys is transmitted about 60 times per second by synchronous communication to the communication control device 91 according to the instructions from the communication control device 91. The communication control device 91 transmits the state of the instruction keys of the controller 20 to the CPU 51.

As a result, the instructions from the user are inputted to the CPU 51, and the CPU 51 performs processing as instructed by the user on the basis of the game program or the like being executed.

Here, a large amount of image data must be transferred at high speed between the main memory 53, the GPU 62, the image decoder 64, the decoder 82, etc., in displaying images, drawing, and so forth. In view of this, so-called DMA transfer can be performed with this video game device, in which direct data transfer is performed between the main memory 53, the GPU 62, the image decoder 64, the decoder 82, etc., by control from the peripheral device controller 52, without going through the CPU 51 as above. This allows the load on the CPU 51 imposed by data transfer to be reduced, and allows the transfer of data to be carried out at a higher speed.

When the setting data for the game being executed needs to be stored, the CPU 51 transmits this stored data to the communication control device 91, and the communication control device 91 writes the data from the CPU 51 to the portable electronic device 100 or the memory card 10 inserted in the slot of the memory card insertion component 8A or 8B.

A protective circuit for preventing electrical breakdown is housed in the communication control device 91. The memory card 10 or the portable electronic device 100 are separated from the bus BUS and can be attached or removed with the power to the main unit still on. Therefore, if the storage capacity of the memory card 10 or the portable electronic device 100 should run out, for instance, a new memory card can be inserted without shutting off the power to the main unit. Accordingly, game data that needs to be backed up is not lost, and the required data can be written to the new memory card after it is inserted.

The parallel I/O interface (PIO) 96 and the serial I/O interface (SIOb) 97 are interfaces for connecting the memory card 10 or the portable electronic device 100 with the video game device 1.

The present invention allows a magnetic recording medium and/or a magnetic playback medium to be provided to the label side of an optical disk.

What is claimed is:

1. An optical disk device in combination with an optical disk, said optical disk comprising:
   a central opening and an outer circumferential edge with:
      a recording area for recording programs defined therebetween,
      a lead-out area defined between said recording area and said outer circumferential edge, and
      an outside area defined outside of said recording area and said lead-out area,
   a first side having thereon a label indicating at least a recording data,
   a second side opposite to said first side, and
   a magnetic substance formed on said outside area of said first side,
   wherein said optical disk device comprises:
      an optical reading device positioned adjacent said second side of said optical disk to read signals from said optical disk recording area, and
      a magnetic sensor positioned adjacent said second side of said optical disk to read said magnetic substance formed on said optical disk outside area,
      wherein said optical reading device and said magnetic sensor are positioned relative to each other so that such device and sensor do not collide when reading their respective optical disk areas.

2. The optical disk device as defined in claim 1, wherein said magnetic substance is used as one of a magnetic recording medium and a magnetic playback medium.

3. The optical disk device as defined in claim 1, wherein personal information about the owner of said optical disk is recorded on said magnetic substance.

4. The optical disk device as defined in claim 1, wherein said magnetic substance is formed by printing.

5. The optical disk device as defined in claim 4, wherein said magnetic substance is formed on said first side as a pattern of a desired shape by printing.

6. The optical disk device as defined in claim 5, wherein said pattern is circular and is concentric with the optical disk.

7. The optical disk device as defined in claim 5, wherein said pattern is of a radial shape with respect to the optical disk.

8. The optical disk device as defined in claim 5, wherein said pattern is of a bar-code shape.

9. The optical disk device as defined in claim 1, wherein said magnetic substance is formed by silk screen printing using an ink containing a magnetic substance.

10. The optical disk device as defined in claim 1, wherein said optical disk is provided With a lead-in area defined between said central opening and said recording area and wherein said magnetic substance is formed by printing in a region at the inside of said lead-in area.

11. The optical disk device as defined in claim 1, wherein said magnetic substance utilizes at least one of recording and playback for security information.

12. The optical disk device as defined in claim 1, wherein said first side is the top side of the optical disk.

13. The optical disk device as defined in claim 1, wherein said optical disk is a CD-ROM.

14. The optical disk device as defined in claim 1, wherein said optical disk device is an entertainment system, said first side is.

15. An optical disk device in combination with an optical disk, said optical disk comprising:
   a central opening and an outer circumferential edge with a recording area for recording programs defined therebetween, a lead-out area defined between said recording area and said outer circumferential edge, and an outside area defined outside of said recording area and said lead-out area,
   a first side having thereon a label indicating at least a recording data,
   a second side opposite to said first side, and
   a magnetic substance formed on said outside area of said first side,
   wherein said optical disk device comprises:
      an optical reading device positioned adjacent said second side of said optical disk o read signals from said optical disk recording area, ad
      a magnetic sensor positioned adjacent said second side of said optical disk to read said magnetic substance formed on said optical disk outside area,
      wherein said optical reading device and said magnetic sensor are moved to read the recording, area and the outside area of the lead-out area respectively without colliding with each other.

* * * * *